Nov. 7, 1967 A. L. WHITEHEAD 3,350,783
METHOD OF SURVEYING AND DEVICE FOR USE IN CONNECTION THEREWITH
Filed Feb. 4, 1965 4 Sheets-Sheet 1
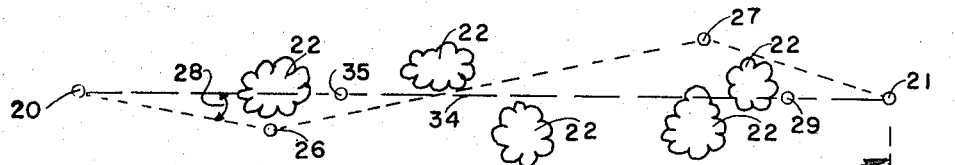
Fig. 1-A
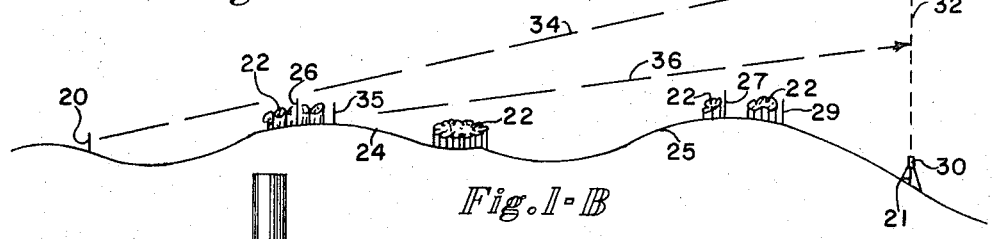
Fig. 1-B
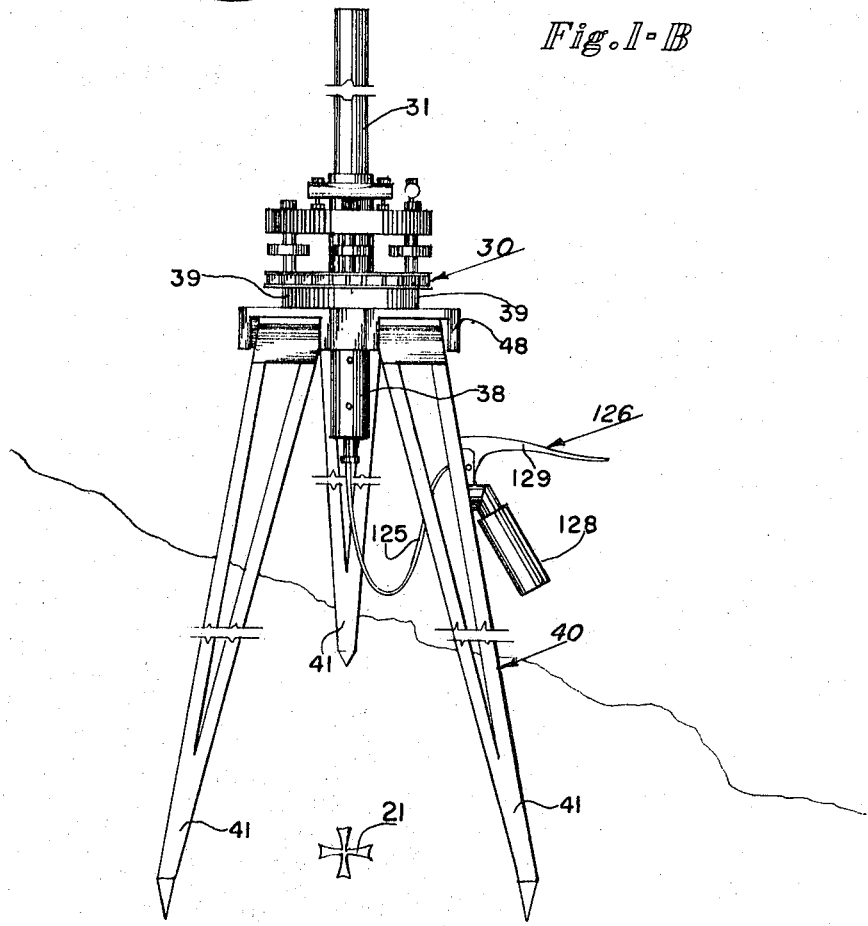
Fig. 2
INVENTOR.
Albert Leigh Whitehead
BY
Ralph F. Crandell
ATTORNEY Nov. 7, 1967     A. L. WHITEHEAD     3,350,783
METHOD OF SURVEYING AND DEVICE FOR USE IN CONNECTION THEREWITH
Filed Feb. 4, 1965     4 Sheets-Sheet 4
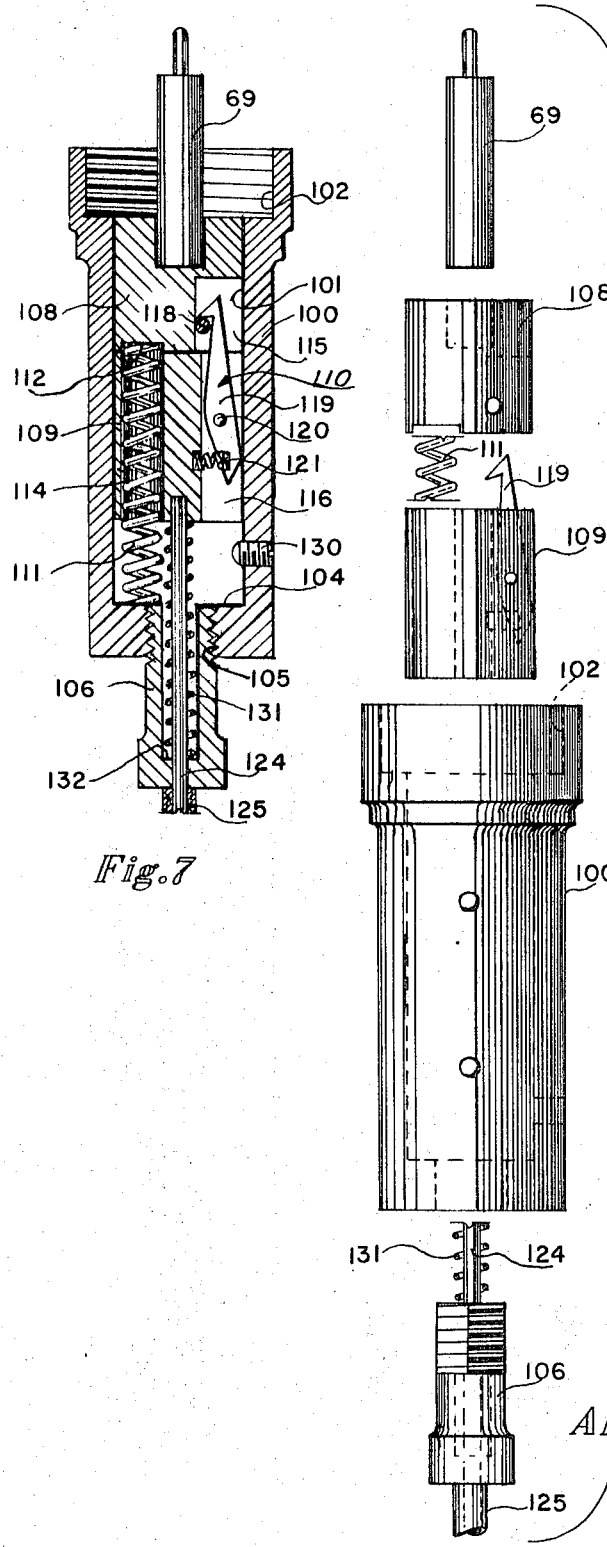
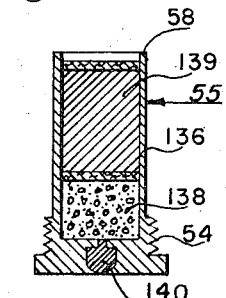
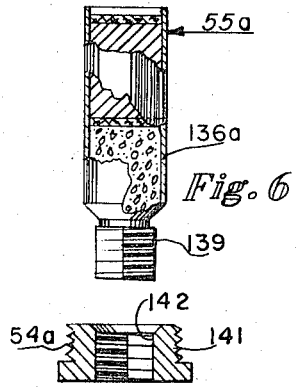
INVENTOR.
Albert Leigh Whitehead
BY
ATTORNEY United States Patent Office
3,350,783
Patented Nov. 7, 1967

3,350,783
METHOD OF SURVEYING AND DEVICE FOR USE IN CONNECTION THEREWITH
Albert Leigh Whitehead, Arvada, Colo.
(2477 San Carlos Circle, Colorado Springs, Colo. 80909)
Filed Feb. 4, 1965, Ser. No. 430,421
7 Claims. (Cl. 33—74)

ABSTRACT OF THE DISCLOSURE

There is described herein a method of surveying in which a visible moving target is projected vertically above a selected point and a sight is taken on the vertically moving target. The target is a rocket flare, tracer bullet or the like, and is projected by an appropriate launcher.

Background and objects of the invention

The present invention relates to a method of surveying and equipment for use therewith, and more particularly to a survey target finding particular, but not necessarily exclusive, use in connection with the location by surveying of straight lines across or along the boundaries of large land areas, such as sections and townships.

It is the principal object of the present invention to provide a method for establishing and surveying a straight line traverse between two points separated by a substantial distance and various obstructions, such as trees, hills, ravines and the like. It is a related object of the present invention to provide a surveyor's field target for use in such a method.

Another object of the present invention is to facilitate the location and surveying of a straight line over substantial distances and across rugged, mountainous, rolling or heavily forested country without necessitating the use of the traverse method and the attendant computation of angles and measurement of distances.

A further object of the present invention is to provide a method and apparatus for surveying a straight line, which method is highly accurate and yet of low cost, and which apparatus is simple, efficient, of low cost, and highly reliable.

Still a further object of the invention is to increase the accuracy of determination of a straight line over a substantial distance.

Still another object of the present invention is to provide a method and apparatus for surveying a straight line which affords a check at intermediate points of the survey and before the survey is completed.

Still a further object of the present invention is to provide a target for use in connection with the surveying of a straight line, which target is stable, easily set up, inexpensive, accurate and capable of operation by one man, whereby the survey may be accomplished with a minimum crew.

Still a further object of the present invention is to provide a survey target which may be operated by direct or remote control, or on an immediate or time delay basis.

Description of the drawing:

FIGURE 1–A is a schematic plan diagram of a straight-line survey problem illustrating one application of the present invention.

FIG. 1–B is a schematic elevation view of the survey problem shown in FIG. 1–A.

FIG. 2 is an elevation view of a ballistic survey target mechanism embodying the present invention.

FIG. 5 is a cross-section view of a rocket flare cartridge of a type suitable for use in the ballistic target mechanism shown in FIG. 2.

FIG. 6 illustrates a modified form of cartridge suitable for use in the target mechanism shown in FIG. 2.

FIG. 6–A illustrates an adapter for use with the cartridge shown in FIG. 6.

FIG. 7 is a full cross-section view of the firing mechanism forming a part of the target mechanism shown in FIGS. 2 and 3.

FIG. 8 is an exploded elevation view of the firing mechanism shown in FIG. 7.

Description of the invention

Figure 3:
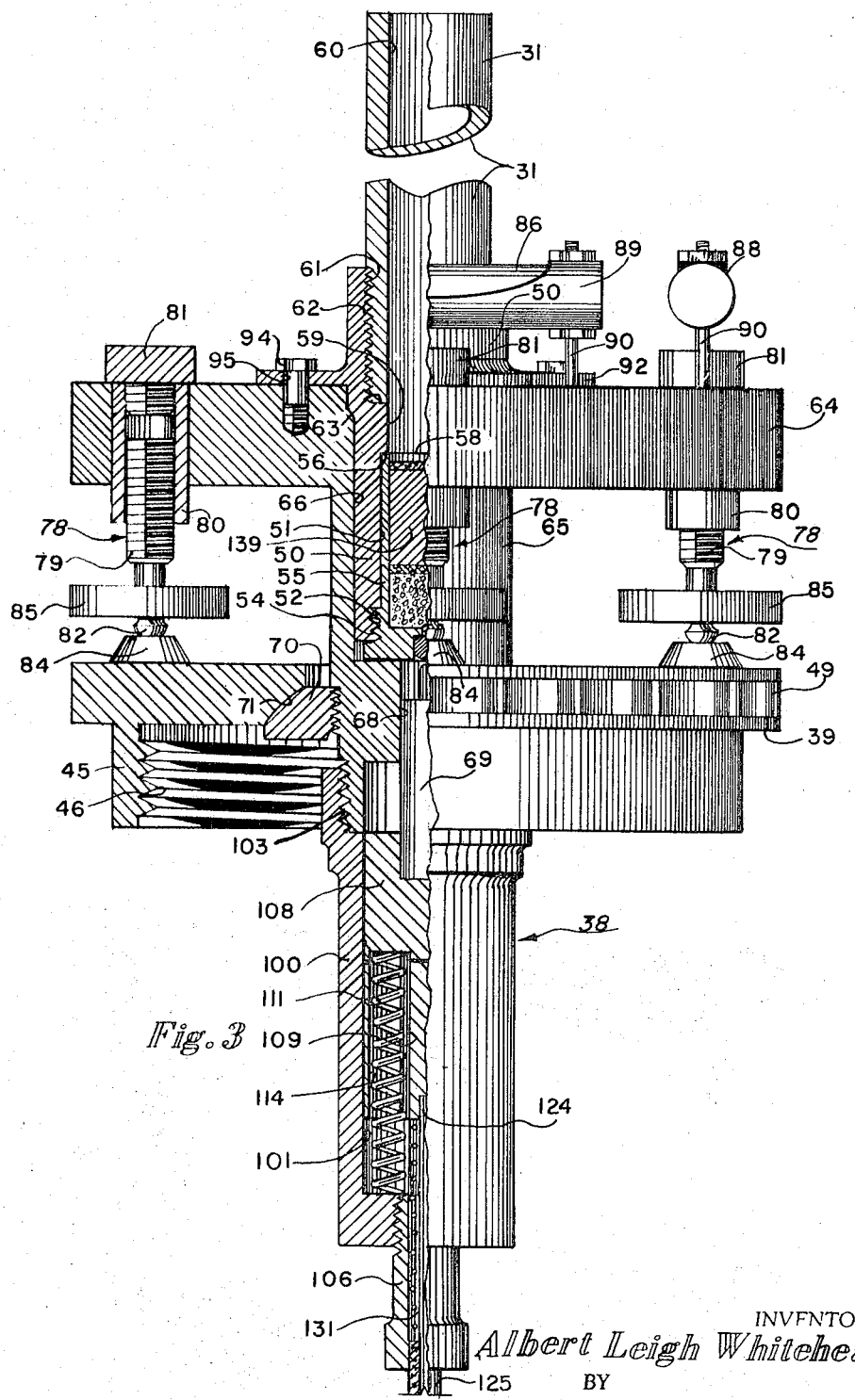
FIG. 3 is an enlarged fragmentary view of a portion of the target mechanism shown in FIG. 2 with parts broken away for clarity.
Figure 4:
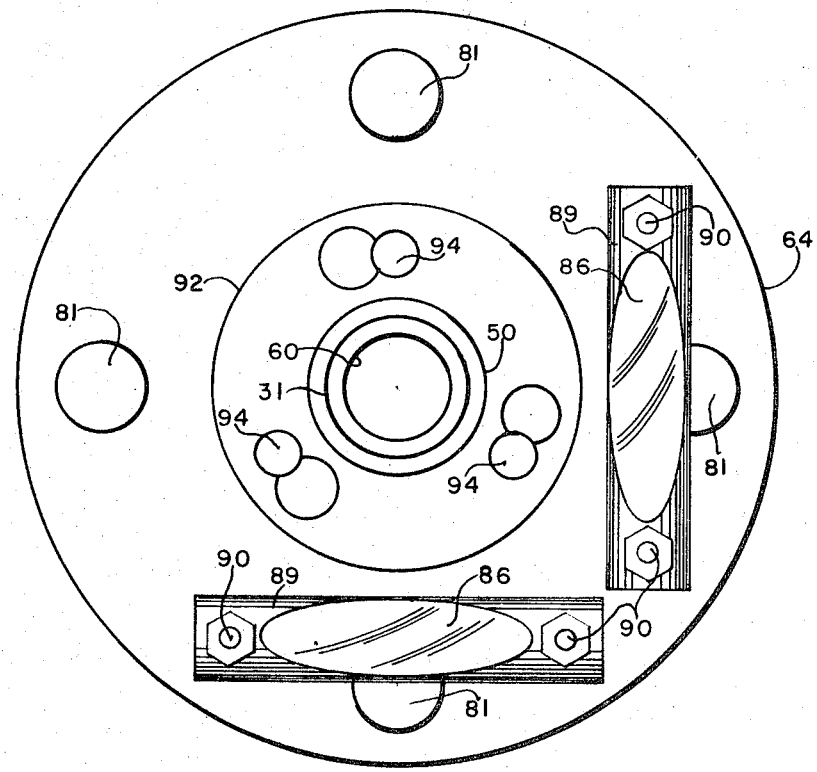
FIG. 4 is a plan view of the mechanism shown in FIG. 3.

In its broadest aspects, the present invention contemplates the facilitation and simplification of the location by surveying of a straight line between two points across a substantial distance, which two points are not visible one from the other and which are separated by a rough or wooded terrain. In using either the method of the present invention or the method heretofore well known to those skilled in the art and widely employed by surveyors, two points are first located as the points between which a straight line traverse is to be established. Referring to FIGS. 1–A and 1–B of the drawings, these points are indicated as points 20 and 21, being the point of beginning and the point of terminus respectively. It will be observed, upon reference to the plan and profile views shown as FIGS. 1–A and 1–B respectively, that the points 20 and 21 are separated by a substantial distance, constituting, for example, 6 miles, if the points define corners of a township, and are not visible one from the other, there being numerous clumps of trees and shrubbery 22 and intervening hills 24, 25. In the conventional method of establishing the bearing of a straight line between the two points 20 and 21 which cannot be seen one from the other, a surveyor will start at point 20 and, knowing the general direction in which point 21 lies, will by use of a transit theodolite proceed from point 20 to point 21 by way of points 26 and 27, and possibly other intermediate points. Distances between each of points 20, 26, 27 and 21 will be measured. By traversing from point 20 to point 26, thence to point 27, and thence to point 21, the surveyor can compute the angle indicated as 28 and thereby determine the bearing of the straight line between points 20 and 21. It will be appreciated that no check is possible until point 29 is reached, at which location, point 21 is visible. This procedure conventionally occupies a three man crew for a period of days and is subject to all the errors of a forced closure.

In accordance with the method of the present invention, the traverse procedure is avoided and the bearing of the straight line between points 20 and 21 is readily located with a minimum of effort. In accordance with this invention, points 20 and 21 are located. The surveyor places his transit theodolite at point 20, and at point 21 he or a member of his crew locates a ballistic target 30 embodying the present invention (as shown in FIG. 2). When the transits are in place, the ballistic target is adjusted so that the barrel 31 is in a vertical position directly above point 21. Means are provided for making this adjustment as will be described below in detail. A rocket flare or other ballistic target is then fired and observed from point 20 by means of the transit, as the flare follows a vertical path 32 indicated in dotted lines in FIG. 1–B. During the firing of this ballistic target, the surveyor with his transit at point 20 has an opportunity to align the transit on the general vertical path of the target. A second ballistic target is then fired in a vertical path directly above point 21, thereby allowing the surveyor at point 20 to establish a fine sighting on the target, this line of sight on the target being shown generally as the dashed line 34 in FIGS. 1-A and 1-B. It will be appreciated that the dashed line 34 lies in a vertical plane which includes the straight line between points 20 and 21. If a greater degree of accuracy is required, a third ballistic target may be fired, thereby allowing the surveyor to make a more exact determination of the bearing.

Having established the course of the straight line between points 20 and 21 by the ballistic method embodying the present invention, the surveyor can then check this by running a line directly along the course thereby established. If he desires, he can establish intermediate point 35 and again take a sighting on a ballistic target fired from point 21 as indicated in the view line 36 shown in FIG. 1-B.

It has been found that by using the ballistic target method embodying the present invention, the accuracy of the location of the straight line is substantially increased. This accuracy is essentially due to the fact that there are no distances to measure or angles to compute, and because the surveyor may check directly from the initial point as well as from various intermediate points on the traverse, even though the terminal point 21 is not visible.

In accordance with another aspect of the present invention, there is shown in FIGS. 2 through 8 of the drawings an illustrative ballistic target mechanism embodying the present invention, by means of which a surveyor may launch a visible ballistic target from a hidden point on which a surveyor at a separate point may make a sight. One illustrative ballistic target launching device mechanism embodying certain aspects and features of this invention is shown in the drawings, which launching device finds particular but not necessarily exclusive utility in connection with the surveying method described above.

Referring to FIG. 2 of the drawings, there is shown therein one illustrative ballistic target launching mechanism. In the device there shown, there is provided a barrel 31 adapted to receive a target projectile 55 (illustrative types of which are illustrated in FIGS. 5 and 6) and a firing mechanism 38 at the breech end of the barrel, all of which is supported upon an appropriate base 39 mounted on a conventional surveyor's tripod 40. The legs 41 of the tripod are readily adjustable so that the unit may be placed on the side of a hill or on uneven terrain as shown in FIG. 2.

Turning to FIG. 3 wherein the ballistic target launching device is shown in more detail, the barrel 31 is adjustably mounted on the base 39 which in turn is provided with a depending skirt or sleeve 45 having internal threads 46 therein adapted to be engaged with corresponding threads (not shown) on a boss or upstanding base (not shown) on a table 48 forming a part of the tripod 40. The base 39 is defined by a cylindrical, generally flat plate, having on its outer peripheral surfaces appropriate gripping notches or lugs 49 so that the base can be securely tightened onto the tripod.

At its lower or receiver end, the barrel 31 is provided with a breech 50 in the form of a sleeve defining an internal bore or chamber 51 having appropriate threads 52 at its inlet end for threadably engaging corresponding external threads 54 on a rocket flare shell or cartridge 55. At the opposite end of the chamber bore 51 there is provided a shoulder 56 adapted to abut the inserted end 58 of the shell or cartridge (FIG. 5). This shoulder terminates in an internal breech bore 59 corresponding in diameter to the bore 60 of the barrel 31. In the modification shown, means are provided for releasably securing the breech onto the barrel. To this end, the breech terminates at a point adjacent the breech bore 59 in a threaded counter bore 61 adapted to threadably engage corresponding external threads 62 on one end of the barrel 31, and an internal shoulder 63 is provided in the breech against which the end of the barrel is seated.

Supporting the barrel 31 and breech 50 on the base 39 for adjustment with respect thereto is a relatively massive platform or plate 64. In order to support the barrel 31, breech 50 and firing mechanism 48, the platform 64 is provided with an integral downwardly extending sleeve 65, defining a bore 66 extending through the platform 64. This bore 66 corresponds substantially in diameter to the outer diameter of the breech 50 and is adapted to telescopingly receive the breech with a cartridge 55 mounted therein. At its lower end, the platform sleeve 65 defines a firing pin bore 68 having a diameter less than the breech receiving bore 66 and adapted to receive the firing pin 69 embodied in the firing mechanism 38.

For supporting the plate 64 for universal adjustment with respect to the base 39 so that the vertical position of the barrel can be established, means are provided for adjustably supporting the platform 64 on the base 39. One illustrative means is shown in the drawings and comprises a plurality of outboard supports 78 and a central universal pivot, ball or spherical sector element 70 having a center on the axis of the instrument. The ball 70 is threadably engaged or otherwise secured to or forms a part of the platform sleeve and is seated within a corresponding downwardly directed socket 71 defined in the base 39. Each of the outboard supports are adjustable for leveling the platform 64, and in the illustrative embodiment shown comprise an externally threaded adjusting screw 79 threadably engaged in an internally threaded sleeve 80 which is rigidly mounted in the platform or plate 64. If desired, an extra cap or plug 81 may be threadably engaged with the sleeve 80 to close the upper end thereof. At the opposite end from the threaded portion, each leveling screw 79 is provided with a rounded bearing knob 82 which is in turn seated in a socket or base 84 mounted on the upper surface of the base 39. For adjusting the screw 79 to vary the spacing between the platform 64 and the base 39, each screw is provided with an appropriate thumb wheel 85. In the modification shown in the drawings, and with particular reference to FIG. 4, it will be appreciated that four leveling screw type outboard supports are provided, each being located on a radius and with the respective radii spaced apart by angles of 90°. In this manner, the platform 64 can be adjusted to any position within the limits of the adjusting screws. To indicate the point at which the platform is level so that the barrel 31 may be aimed or plumbed in a vertical direction, at least two levels 86, 88 are provided. These levels are desirably mounted over adjacent leveling screws as shown in FIG. 3 so that the platform may be readily adjusted to any desired plane by adjusting the two leveling screws lying in a plane parallel to that of one of the levels. The levels are each mounted in a suitable housing 89 which is in turn supported on the platform 64 by appropriate legs or mounts 90.

In order to facilitate the insertion and removal of a cartridge 55 from chamber 51 in the breech 50, the barrel 31 and breech 50 are removeably mounted on the platform 64. One illustrative mounting means comprises a flange 92 rigidly extending from the breech 50 and adapted to be supported on the upper surface of the platform 64. The flange 92 is releasably engaged with the platform 64 by means of bayonet type connectors, which connectors are afforded by spaced headed pins 94 engageable in bayonet type slots 95 in the flange 92. In the structure shown, three such bayonet pins are provided, although it will be appreciated that two or four such pins might be employed to advantage. By giving the barrel 31 and breech 50 a partial turn, the flange 92 may be released from the bayonet pins 94 and the entire breech and barrel assembly separated from the platform 64. A spent flare cartridge may then be removed, a new one placed in the chamber, and the assembly reinserted in the platform bore 66 and secured to the bayonet pins 94, whereupon the mechanism is ready for firing.

Various types of firing mechanisms may be employed, and these mechanisms may include both mechanical structures as well as electrical or remote control structures such as solenoids. An illustrative mechanical type firing mechanism has been shown in the drawings (FIGS. 7 and 8), which mechanism is adapted to be threadably engaged with the lower end of the platform sleeve 65. The illustrative firing mechanism 38 (FIGS. 7 and 8) comprises a sleeve like housing 100 defining a bore 101 terminating in a counter bore 102 having internal threads adapted to be threadably engaged with corresponding threads 103 on the lower end of the platform sleeve 65. At the opposite end of the bore from the counter bore, the housing 101 defines an internal shoulder 104 extending inwardly and terminating in a threaded opening 105 adapted to receive the threaded end of an appropriate trigger-cable connector 106. The firing mechanism contained within the housing 101 comprises a pair of cylindrical blocks 108, 109 slideably mounted within the bore 101. The upper one of said blocks 108 mounts the firing pin 69 and is releasably latched to the second block 109 by a latch mechanism indicated generally at 110. The firing pin block 108 is urged toward the breech chamber by a heavy firing pin spring 111 acting between the shoulder 104 and the base 102 of the block 108 and extending through a bore 114 in the second or latch block 109.

To receive the latch mechanism 110 each of the blocks 108, 109 are provided with a groove or notch 115, 116 respectively, which notches are axially aligned with each other. In the notch 115 in the firing pin block 108 there is provided a latch pin or strike 118, engageable by a latch 119 pivotally mounted on an appropriate pin 120 in the groove 116 in the latch block 109. To hold the latch 119 in engagement with the pin or strike 118, a latch biasing spring 121 is provided between the base of the groove 116 and the latch 119. In operation of the firing mechanism, with the latch engaged, both blocks 108 and 109 are pulled against the force of the firing pin spring 111 by means of a cable 124 fixed at one end to the latch block 109 and extending through an appropriate cable housing 125 to a cable pulling mechanism indicated generally at 126 (FIG. 2). The cable mechanism comprises a support 128 to which is pivotally mounted a cable pulling handle 129, one end of which is affixed to the cable so as to pull the same through the cable housing 125 and thereby pull block 109 against the force of the firing pin spring 111. Firing is accomplished when both blocks 108 and 109 reach a point wherein the firing pin latch 119 is released. One appropriate release mechanism is shown in FIG. 7 and comprises a latch release pin 130 extending through the wall of the housing 100 and adapted to engage the end of the latch 119 opposite from the portion thereof engaging the pin 118, and cam the same against the force of the spring 121 and thereby release block 108 which, carrying the firing pin, is urged away from block 109 by the firing pin spring 111 and with sufficient force against the firing cap of the cartridge 55 to fire the same, whereby the flare charge is propelled outwardly through the bore 60 of the barrel 31. To return the latch block 109 into latch engaging position with the firing pin block 108 upon release of the trigger 129, a small spring 131 surrounding the cable 124 acts between a shoulder 132 at the base of the cable attachment housing 106 and the underside of the latch block 109 to lift the block 109 and urge the same against the firing pin block 108. When the cable pulling handle or trigger 129 is released, the spring 131 urges the latch block 109 toward the firing pin block 108 so that the latch 119 engages with the pin 118. The firing mechanism is then ready for the next firing.

Various types of rocket flare cartridges may be employed in connection with the present invention. Two types finding particular but not necessarily exclusive use in connection with the ballistic target mechanism described herein are shown in FIGS. 5, 6 and 6-A. These cartridges 55, in one illustrative form (FIG. 5), comprise a shell or casing 136 having threads 54 formed therein at one end thereof for engagement with the breech threads 52 when the cartridge is inserted into the breech bore 51. Contained within the casing 136 is a propellant charge 138 and a flare charge 139, as well as a firing charge or cap 140 adapted to be engaged by the firing pin to ignite the propellant 138.

In more general terms, it is desirable that the target projected from the ballistics mechanism herein described be of a type capable of sustained, controlled flight along a substantially vertical trajectory. Accordingly, it is desirable that the target constitute a flare capable of reaching an altitude of between 150 and 500 feet. In order to give the surveyor sufficient time in which to sight the target, it is desirable further that the flare have a burning time of between 5 and 10 seconds as well as a visibility of up to 8 miles, both in bright as well as in cloudy weather. One illustrative flare meeting these requirements is presently available in commercial quantities on the market under the trade name, "Mayday," a trade name of Genrus Engineering Specialties, and is shown in FIG. 6. The "Mayday" form of cartridge indicated generally at 55a in FIG. 6 is similar to that described in connection with FIG. 5 and finds use as a rescue or warning flare. Basically, the flare 55a shown in FIG. 6 is identical to that shown in FIG. 5 except for the size of the base of the cartridge casing 136, which base is a smaller externally threaded member 139. To use such a flare in the ballistic target mechanism described, there is provided an adapter 141 (FIG. 6-A) having an internally threaded portion 142 adapted to receive the threaded base 139 of the casing 136a and having external threads 54a adapted to be threadably engaged with the threads 52 in the breech 50. It will be further appreciated, of course, that other types of flares meeting the foregoing requirements can be used.

In the foregoing, a new method of surveying has been described, and a particular apparatus for use in carrying out that method has been descibed in detail. Those skilled in the art will appreciate that basically any means of orienting and vertically aiming a suitable projectile in a vertically oriented trajectory over a survey point may be utilized in the method of this invention. Among the various possibilities are small rockets which can be readily launched from a fixed point and designed to traverse a vertical trajectory above that point. These rockets may be propelled by any suitable means, such as a solid fuel propellant or a mechanical device. Moreover, the rockets may be of the recoverable type or may be expendable. Additionally, and by way of illustration, a device may be employed for discharging tracer bullets and other projectiles, leaving a visible path, into a vertical trajectory above the survey point. Doubtless, additional methods and devices for use in connection with the present invention will occur to those skilled in the art, and it is the intention herein to include such modifications and uses as fall within the spirit and scope of the invention as expressed in the following claims.

I claim as my invention:

1. A method of surveying a straight line between two points comprising the steps of positioning a launching device along a precisely determined vertical axis through one of said points, ballistically projecting a visible moving target along said axis directly above said one of said points, sighting said vertically moving target from the other of said points and establishing the bearing of a straight line between said points in accordance with said sighting between said other point and said vertically moving target.

2. A method of surveying a straight line between two points located a substantial distance apart and not visible one from the other, said method comprising the steps of positioning a launching device along a precisely determined vertical axis through one of said points, ballistically projecting a visible target along said axis directly above said one of said points to present a vertically moving target visible from the other of said points; sighting said vertically moving target from said other point; and establishing the bearing of a straight line between said other point and said vertically moving target in accordance with said sighting.

3. A method of surveying a straight line between first and second points located a substantial distance apart and not visible one from the other, said method comprising the steps of positioning a launching device along a precisely determined vertical axis through one of said points, ballistically projecting a visible target along said axis directly above said first point to present a vertically moving target visible from said second point; sighting said vertically moving target from said second point; and establishing the bearing of a straight line between said first and second points in accordance with said sighting.

4. A method of surveying a straight line between first and second points located a substantial distance apart and not visible one from the other, said method comprising the steps of positioning a launching device along a precisely determined vertical axis through one of said points, ballistically projecting a rocket flare target along said axis directly above said first point to present a vertically moving target visible from said second point; sighting said vertically moving target from said second point; and establishing the bearing of a straight line between said first point and said vertically moving rocket flare target in accordance with said sighting, thereby to establish the bearing of a straight line between said first and second points.

5. The method of surveying as described in claim 1 wherein said target comprises a rocket flare.

6. The method of surveying as described in claim 1 wherein said target comprises a visible rocket.

7. The method of surveying as described in claim 1 wherein said target comprises a series of tracer projectiles.

References Cited

UNITED STATES PATENTS 1,162,395  4/1958  Rosset _____ 33—74

SAMUEL S. MATTHEWS, *Primary Examiner.*